United States Patent [19]

Nishiwaki et al.

[11] Patent Number: 5,229,955
[45] Date of Patent: Jul. 20, 1993

[54] APPARATUS FOR DETECTING ROAD SURFACE FRICTIONAL COEFFICIENT

[75] Inventors: Masaaki Nishiwaki, Mishima; Hiroshi Harada; Hisanori Kaneko, both of Susono, all of Japan

[73] Assignee: Toyota Jidosha Kabushiki Kaisha, Toyota, Japan

[21] Appl. No.: 665,957

[22] Filed: Mar. 8, 1991

[30] Foreign Application Priority Data

Mar. 9, 1990 [JP] Japan ................... 2-59415

[51] Int. Cl.$^5$ ............................................. G01B 5/28
[52] U.S. Cl. .............................. 364/550; 364/424.05; 73/105; 180/142
[58] Field of Search .............. 364/424.05, 426.02, 364/426.04, 426.01, 550; 73/105; 180/197, 170, 249, 142; 280/707, 840

[56] References Cited

U.S. PATENT DOCUMENTS

| 4,651,290 | 3/1987 | Masaki et al. ................ 73/105 |
| 4,669,569 | 6/1987 | Suzuki et al. ................ 180/249 |
| 4,809,175 | 2/1989 | Hosaka et al. ............... 364/426.02 |
| 4,837,727 | 6/1989 | Tashiro et al. ............... 73/105 |
| 4,842,342 | 6/1989 | Takahashi et al. ............ 364/426.02 |
| 4,930,084 | 5/1990 | Hosaka et al. ............... 364/426.02 |
| 4,947,332 | 8/1990 | Ghoneim .................... 180/197 |
| 4,984,163 | 1/1991 | Kuwana et al. ................ 73/105 |
| 5,001,640 | 3/1991 | Matsumoto et al. .......... 364/426.01 |
| 5,034,890 | 7/1991 | Sugasawa et al. ............. 73/105 |
| 5,060,157 | 10/1991 | Tado et al. ................. 364/424.05 |

Primary Examiner—Gary Chin
Attorney, Agent, or Firm—Cushman, Darby & Cushman

[57] ABSTRACT

A detecting apparatus for detecting a frictional coefficient of the road surface on which an automotive vehicle travels. In the detection apparatus, a plurality of condition amounts related to at least one of the vehicle in braking operation, turning operation and a weather condition during travel of the vehicle are detected. Fuzzy inference is carried out on the detected conditional amounts to determine the compatibility of road surface frictional coefficients corresponding with the detected condition amounts. The fuzzy inference outputs are used to calculate a road surface frictional coefficient.

11 Claims, 16 Drawing Sheets

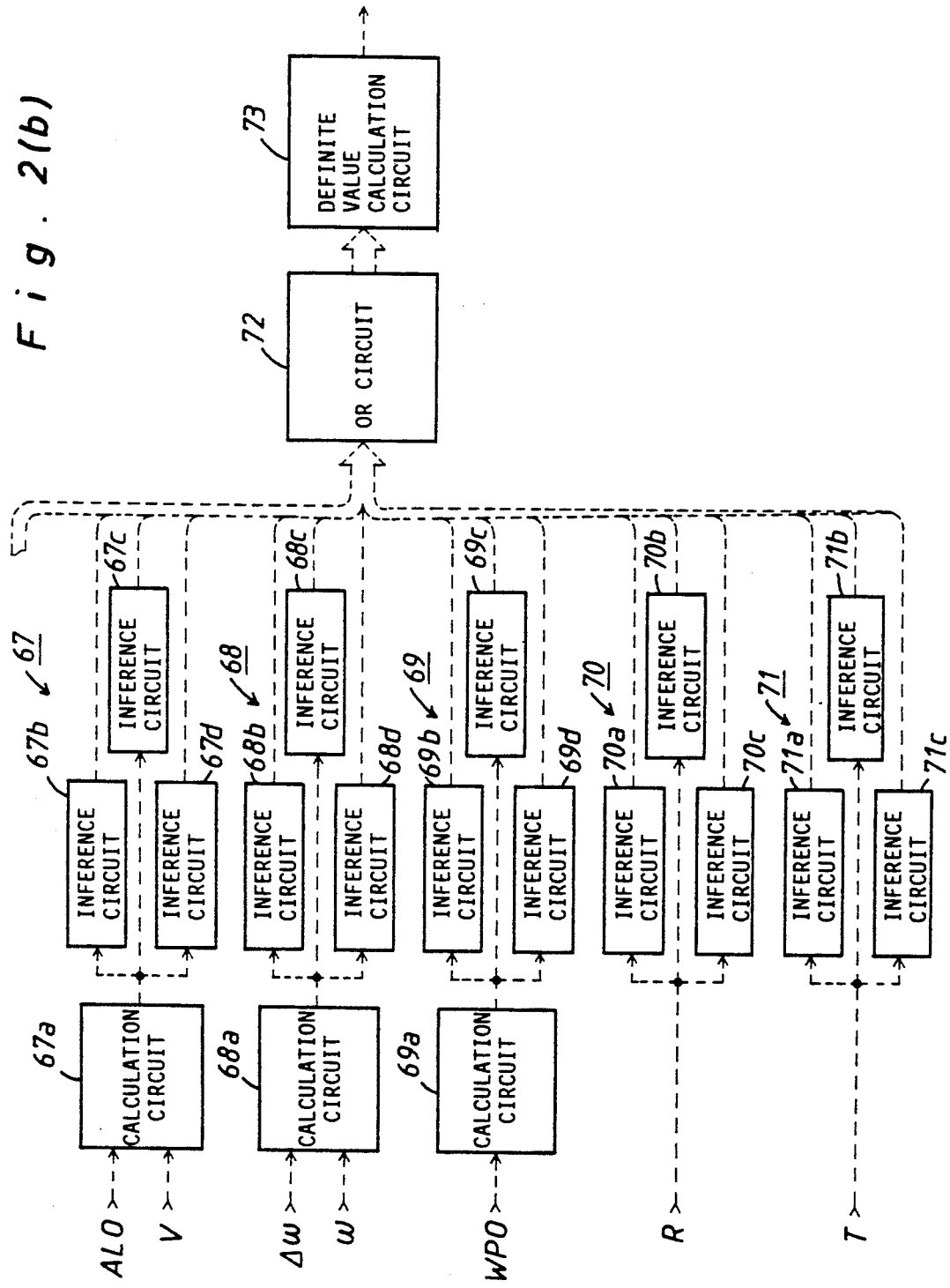

APPARATUS FOR DETECTING ROAD SURFACE FRICTIONAL COEFFICIENT

BACKGROUND OF THE INVENTION

1. Field of the Invention

The present invention relates to an apparatus for detecting a frictional coefficient of the road surface on which an automotive vehicle travels.

2. Description of the Prior Art

In Japanese Patent Early Publication No. 63-84879, there has been proposed such a road surface frictional coefficient detection apparatus as described above which includes a torque sensor arranged to detect a torque acting on a steering shaft and a steering angle sensor arranged to detect a rotation angle of a steering wheel. In the detection apparatus, a road surface frictional coefficient is estimated on a basis of a two-dimensional table representing the facts that strain of the steering shaft increases in accordance with an increase of the road surface frictional coefficient and that the torque acting on the steering shaft increases in accordance with an increase of the steering angle in a condition where the tire resistance of the vehicle are the same. It is however, apparent that the torque and steering angle relative to the road surface frictional coefficient will change in accordance with various travel conditions of the vehicle. For this reason, proper estimation of the road surface frictional coefficient may not be expected.

SUMMARY OF THE INVENTION

It is, therefore, a primary object of the present invention to provide a detection apparatus capable of detecting a road surface frictional coefficient as precisely as possible for more reliable control of an active suspension system, a power-assisted steering apparatus for a front-wheel steering mechanism, a rear-wheel steering mechanism and the like in an automotive vehicle.

According to the present invention, the primary object is attained by providing a detection apparatus for detecting a frictional coefficient of the road surface on which an automotive vehicle travels, which apparatus comprises detection means for detecting a plurality of condition amounts related to at least one of a condition at respective portions of the vehicle in turning operation or braking operation and various weather conditions during travel of the vehicle, fuzzy inference means responsive to input signals indicative of the detected condition amounts for providing a plurality of fuzzy inference data related to roar surface frictional coefficients corresponding with the detected condition amounts, and means for sequentially synthesizing the fuzzy inference data applied thereto from the fuzzy inference means and for calculating a definite value of road surface frictional coefficient based on the synthesized fuzzy inference data.

BRIEF DESCRIPTION OF THE DRAWINGS

Other objects, features and advantages of the present invention will be more readily appreciated from the following detailed description of a preferred embodiment thereof when considered with reference to the accompanying drawings, in which:

FIGS. 2(a) and 2(b) each are a block diagram of the road surface frictional coefficient detection apparatus shown in FIG. 1(b);

DESCRIPTION OF THE PREFERRED EMBODIMENT

Figure 1A:
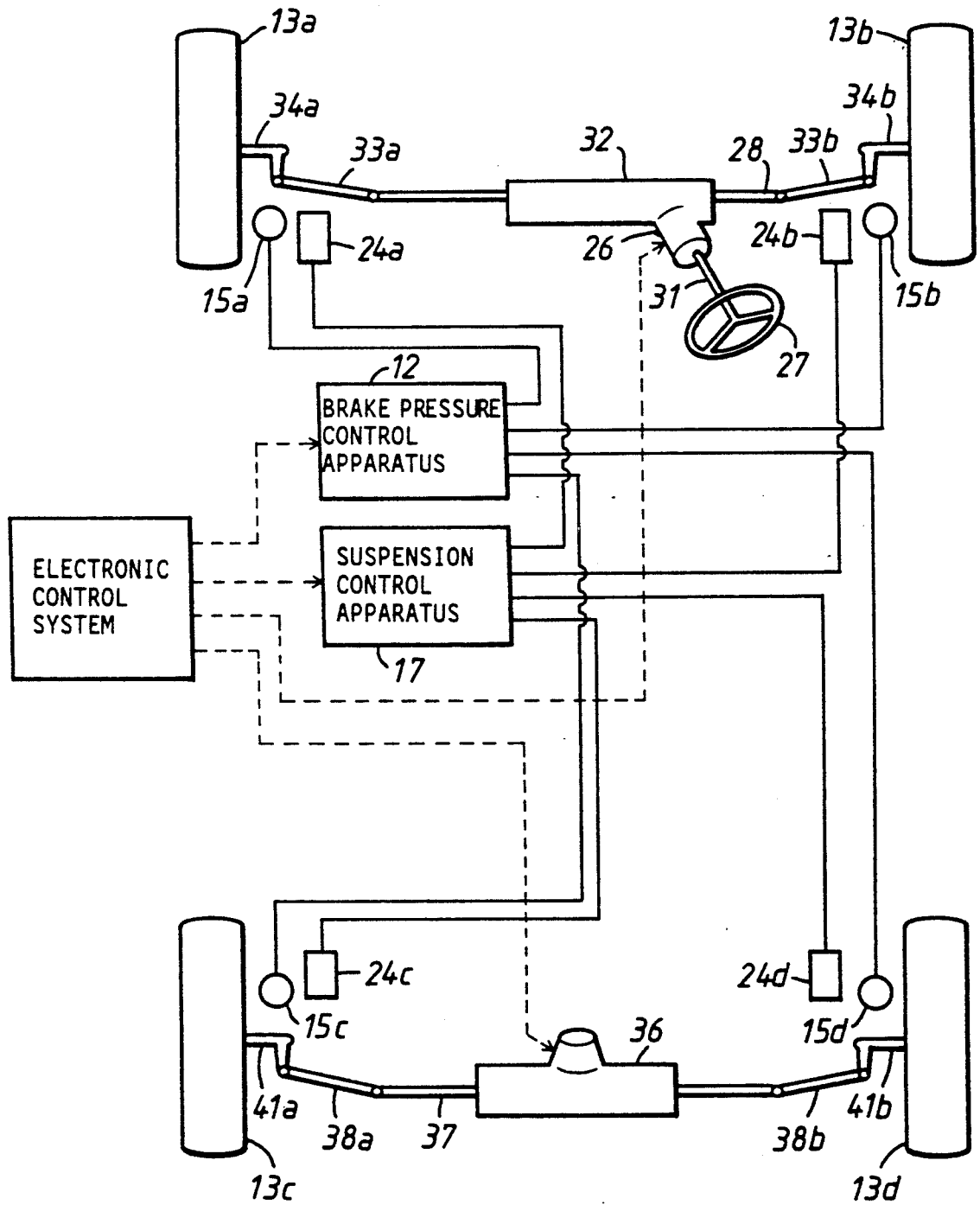
FIG. 1(a) is a schematic illustration of an automotive vehicle provided with an electronic control system including a road surface frictional coefficient detection apparatus according to the present invention.
Figure 1B:
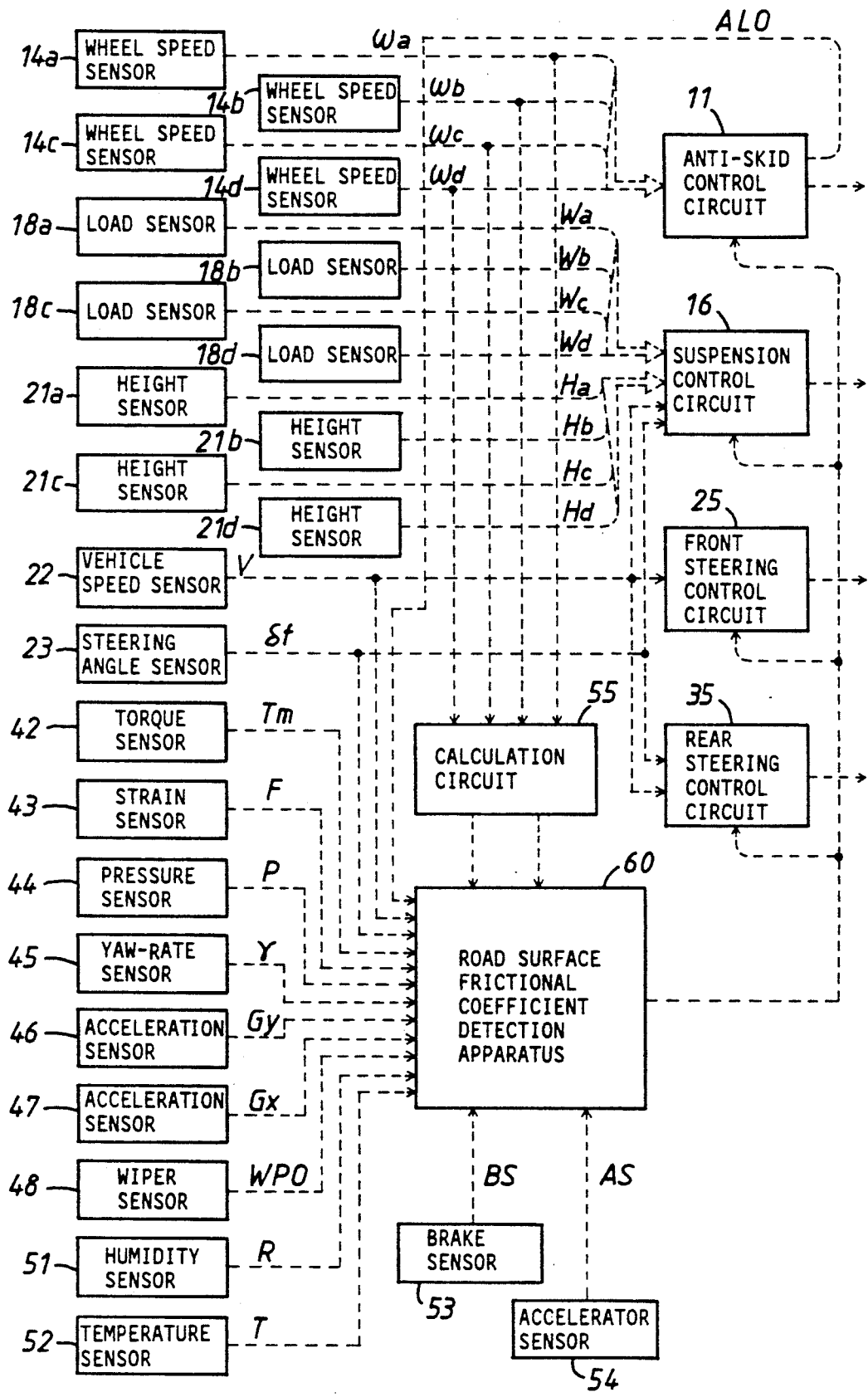
FIG. 1(b) is a block diagram of the electronic control system shown in FIG. 1(a)

In FIG. 1(a) of the drawings, there is illustrated an automotive vehicle equipped with an anti-skid brake control system, an active suspension system, a power-assisted steering apparatus for a front-wheel steering mechanism and a rear-wheel steering mechanism the operations of which are controlled in accordance with a road surface frictional coefficient detected by a detection apparatus 80 of the present invention. As shown in FIGS. 1(a) and 1(b), the anti-skid brake control system includes an electric anti-skid control circuit 11 and a hydraulic brake pressure control apparatus 12. The anti-skid control circuit 11 is connected to wheel speed sensors 14a-14d arranged to detect respective rotation speeds $\omega a-\omega d$ of road wheels 13a-13d for producing electric wheel speed signals indicative of the detected rotation speeds of road wheels 13a-13d. When applied with the wheel speed signals from the wheel speed sensors 14a-14d, the anti-skid control circuit 11 produces an electric anti-skid control signal ALO for avoiding lock of the road wheels 13a-13d and applies it to the brake pressure control apparatus 12. The brake pressure control apparatus 12 is connected to brake cylinders 15a-15d of the road wheels 13a-13d to control the hydraulic pressure applied to the wheel brake cylinders 15a-15b in accordance with the anti-skid control signal ALO from the control circuit 11.

As shown in FIGS. 1(a) and 1(b), the active suspension system includes an electric suspension control circuit 16 and a hydraulic suspension control apparatus 17. The electric suspension control circuit 16 is connected to load sensors 18a-18d arranged to detect respective loads Wa-Wd acting on the road wheels 13a-13d for producing electric signals respectively indicative of the detected loads Wa-Wd, vehicle height sensors 21a-21d arranged to detect each height Ha-Hd of the vehicle body at the road wheels 13a-13d for producing electric signals respectively indicative of the detected vehicle heights Ha-Hd, a speed sensor 22 arranged to detect a travel speed of the vehicle for producing an electric speed signal indicative of the detected vehicle speed V, and a steering angle sensor 23 arranged to detect a rotation angle $\delta f$ of the steering wheel 27 for producing an electric signal indicative of the detected rotation angle $\delta f$. The suspension control circuit 16 is responsive to the electric signals from sensors 18a-18d, 21a-21d, 22 and 23 to produce an electric control signal for control of the vehicle posture in accordance with the detected loads Wa-Wd, vehicle height Ha-Hd, vehicle speed V and steering angle $\delta f$. The suspension control apparatus 17 includes hydraulic suspension cylinders 24a-24d which are respectively assembled with the road wheels 13a-13d to support the vehicle body structure thereon. When applied with the electric control signal from the suspension control circuit 16, the suspension control apparatus 17 regulates the pressure in the suspension cylinders 24a–24d in accordance with the control signal value.

As shown in FIGS. 1(a) and 1(b), the power-assisted steering apparatus includes a steering control circuit 25 connected to the speed sensor 22 and a changeover valve 26 mounted on a steering shaft 31. The steering control circuit 25 is responsive to the speed signal from sensor 22 to produce an electric control signal for control of a reaction acting on the steering shaft 31 in accordance with the vehicle speed. The changeover valve 26 is arranged to control hydraulic fluid under pressure supplied to and discharged from a front power cylinder 32 in accordance with a steering torque applied to the steering shaft 31 and to apply a reaction to the steering shaft 31 in accordance with an instant value of the control signal from the steering control circuit 25. The front power cylinder 32 is arranged to effect axial movement of a lateral rack bar 28 in accordance with the hydraulic fluid under pressure supplied thereto so as to assist steering operation of the front road wheels 13a and 13b. The rack bar 28 is operatively connected at its opposite ends to the front road wheels 13a, 13b by means of tie rods 33a, 33b and knuckle arms 34a, 34b.

As shown in FIGS. 1(a) and 1(b), the rear-wheel steering mechanism includes a rear power cylinder 36 arranged to be operated under control of a rear-wheel steering control circuit 35 in connection to the speed sensor 22 and steering angle sensor 23. The rear-wheel steering control circuit 35 is responsive to the electric signals from sensors 22 and 35 to calculate an optimum steering angle of the rear road wheels 13c, 13d in accordance with the vehicle speed V and steering angle δf for producing an electric control signal indicative of the optimum steering angle. The rear power cylinder 36 is operated in response to the electric control signal from the control circuit 35 to effect axial movement of a relay rod 37 such that the rear road wheels 13c, 13d are steered at the optimum steering angle. The relay rod 37 is operatively connected at its opposite ends to the rear road wheels 13c, 13d by means of tie rods 38a, 38b and knuckle arms 41a, 41b.

For detecting a road surface frictional coefficient, the detection apparatus 60 of the present invention is commonly connected to a portion of the sensors described above and is further connected to a torque sensor 42, a strain gauge type sensor 43, a hydraulic pressure sensor 44, a yaw-rate sensor 45, acceleration sensors 46, 47, a wiper operation sensor 48, a humidity sensor 51, an outside air temperature sensor 52, a brake sensor 53 and an accelerator sensor 54. The torque sensor 42 is mounted on the steering shaft 31 to measure a torsional strain of the steering shaft 31 for producing an electric signal indicative of a torque Tm applied to the steering shaft 31. The strain gauge type sensor 43 is mounted on the rack bar 28 or tie rods 33a, 33b to measure an axial strain of the rack bar 28 for producing an electric signal indicative of an axial force F acting on the rack bar 28. The hydraulic pressure sensor 44 is mounted within the changeover valve 26 to detect the hydraulic pressure P applied to the front power cylinder 32 for producing an electric signal indicative of the detected hydraulic pressure P. The yaw-rate sensor 45 is mounted on the vehicle body structure to detect a yaw-rate γ acting thereon for producing an electric signal indicative of the detected yaw-rate.

The acceleration sensor 46 is mounted on the vehicle body structure to detect a lateral acceleration Gy acting thereon for producing an electric signal indicative of the detected lateral acceleration Gy, while the acceleration sensor 47 is mounted on the vehicle body structure to detect a longitudinal acceleration Gx acting thereon for producing an electric signal indicative of the detected longitudinal acceleration Gx. The wiper operation sensor 48 is mounted on a wiper drive mechanism to detect operation of the wiper for producing a pulse signal WPO therefrom per one reciprocating movement of the wiper. The humidity sensor 51 is mounted on the vehicle body structure to detect humidity R of the atmospheric air for producing an electric signal indicative of the detected humidity R. The outside air temperature sensor 52 is mounted on the vehicle body structure to detect an outside air temperature T for producing an electric signal indicative of the detected temperature T. The brake sensor 53 is in the form of a detection switch arranged adjacent a brake pedal to be closed by depression of the brake pedal for producing an electric signal BS indicative of depression of the brake pedal. The accelerator sensor 54 is in the form of a detection switch arranged adjacent an accelerator pedal to be closed by depression of the accelerator pedal for producing an electric signal AS indicative of depression of the accelerator pedal.

Figure 2A:
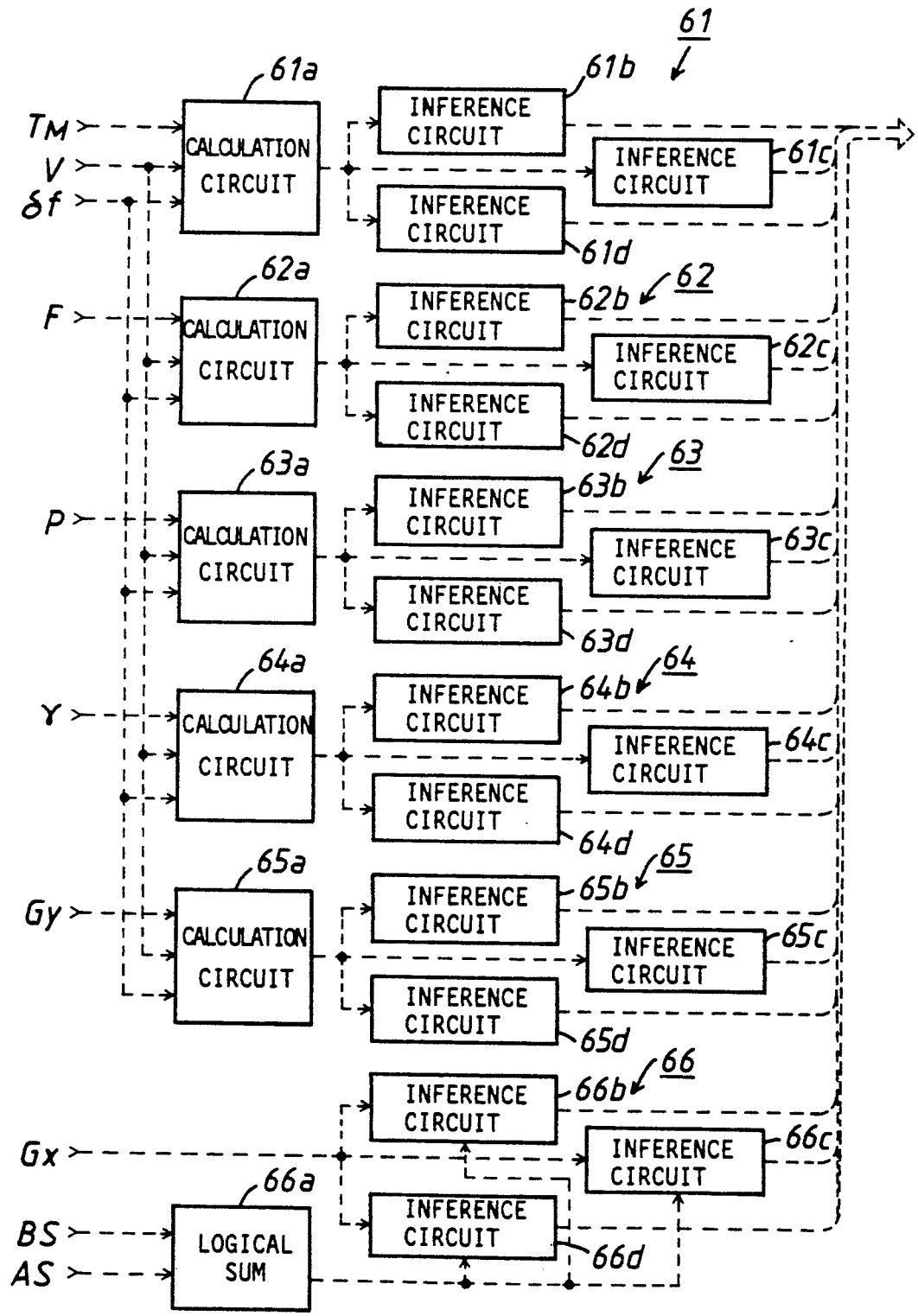

The road surface frictional coefficient detection apparatus 60 is connected to the anti-skid control circuit 11 to be applied with the anti-skid control signal ALO and is connected to a rotation number calculation circuit 55 which is responsive to the electric signals from wheel speed sensors 14a–14d to calculate a difference Δω in speed between the front road wheels 13a, 13b and the rear road wheels 13c, 13d ($\Delta\omega = |(\omega a + \omega b - \omega d)|/2$) and an average speed ω of all the road wheels ($\omega = (\omega a + \omega b + \omega c + \omega d)/4$). As shown in FIGS. 2(a) and 2(b), the frictional coefficient detection apparatus 60 includes fuzzy inference circuit portions 61–71 which are arranged to obtain fuzzy inference data related to a road surface frictional coefficient in accordance with the detected torque Tm, axial force F, hydraulic pressure P, yaw-rate γ, lateral acceleration Gy, longitudinal acceleration Gx, anti-skid control signal ALO, difference Δω in speed between the front and rear road wheels, wiper operation signal WPO, humidity R and outside air temperature T.

Figure 3A:
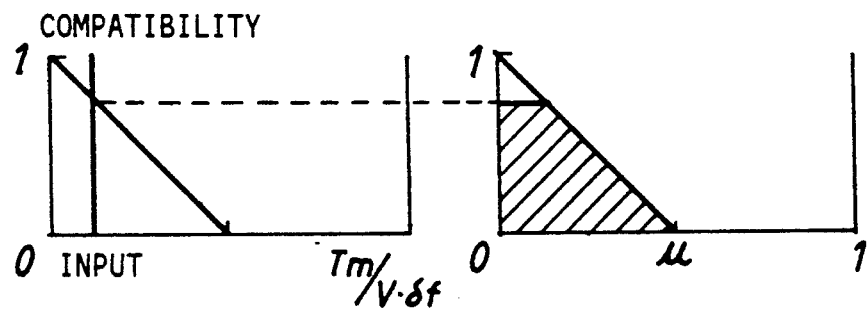
FIGS. 3(a)-3(c) to 13(a)-13(c) each are a graph showing a membership function of a fuzzy control rule.
Figure 3B:
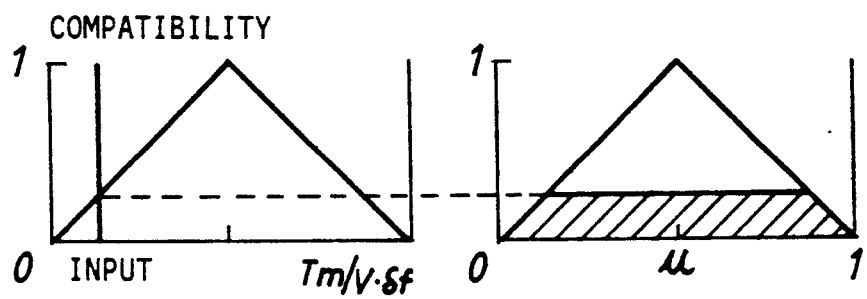
Figure 3C:
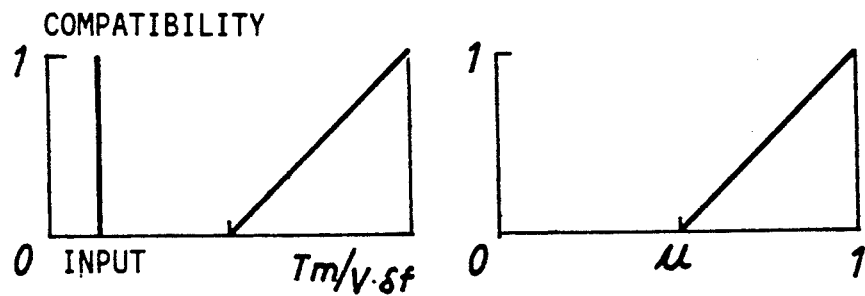

The fuzzy inference circuit portion 61 is composed of a calculation circuit 61a and inference circuits 61b–61d. The calculation circuit 61a is applied with the electric signals indicative of the torque Tm, vehicle speed V and steering angle δf to calculate a value Tm/(V* δf) and apply the calculated value to the inference circuits 61b–61d. In this instance, the value V* δf is approximately proportional to a centrifugal force acting on the vehicle body during turning of the vehicle, and the value Tm/(V* δf) represents a ratio of the torque Tm of steering shaft 31 to the centrifugal force. In the following description, the value Tm/(V* δf) is simply called an input torque ratio. The inference circuits 61b–61d are designed to provide fuzzy inference data indicative of a compatibility of a road surface frictional coefficient related to the input torque ratio Tm/(V* δf) on a basis of the following fuzzy control rules (1)–(3) such as membership functions shown in FIGS. 3(a)–3(c). In FIGS. 3(a)–3(c), the fuzzy ineference data is indicated by a hatched portion.

(1) If the input torque ratio Tm/(V* δf) is small, the road surface frictional coefficient μ is then defined as a small value.

(2) If the input torque ratio Tm/(V* δf) is large, the road surface frictional coefficient μ is then defined as a medium value.

(3) If the input torque ratio Tm/(V* δf) is large, the road surface frictional coefficient μ is then defined as a large value.

Figure 4A:
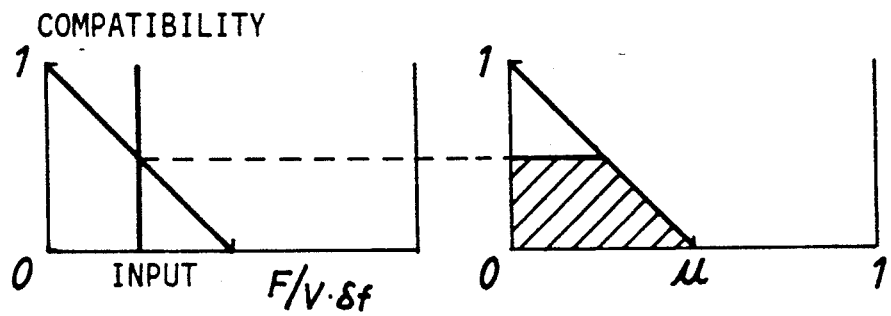
Figure 4B:
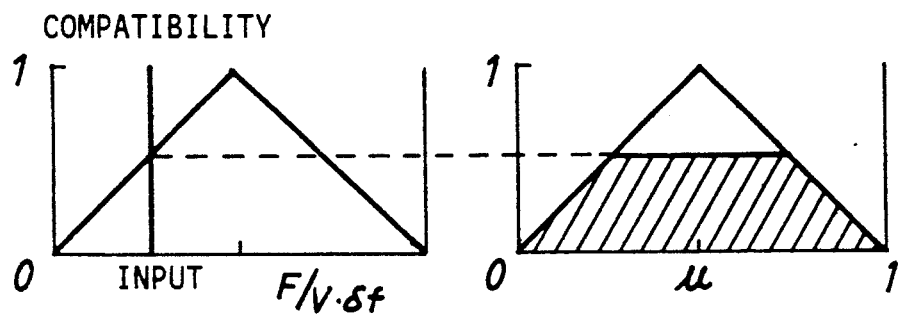
Figure 4C:
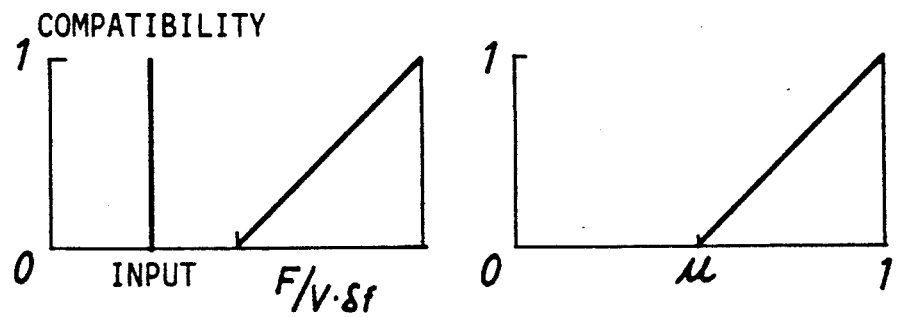

The inference circuit portion 62 is composed of a calculation circuit 62a and inference circuits 62b–62d. The calculation circuit 62a is applied with the electric signals indicative of the axial force F, vehicle speed V and steering angle δf to calculate an input axial force ratio F/(V* δf) and apply the calculated data to the inference circuits 62b–62d. The inference circuits 62b–62d are designed to provide fuzzy inference data indicative of a compatilibity of a road surfac frictional coefficient related to the input axial force ratio F/(V* δf) on a basis of the following fuzzy control rules (4)–(6) such as membership functions shown in FIGS. 4(a)–4(c). In FIGS. 4(a)–4(c), the fuzzy ineference data is indicated by a hatched portion.

(4) If the input axial force ratio F/(V* δf) is small, the road surface frictional coefficient μ is then defined as a small value.

(5) If the input axial force ratio F/(V* δf) is medium, the road surface frictional coefficient μ is then defined as a medium value.

(6) If the input axial force ratio F/(V* δf) is large, the road surface frictional coefficient μ is then defined as a large value.

Figure 5A:
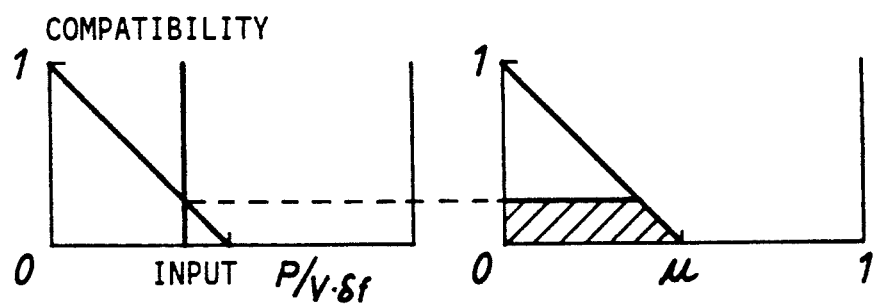
Figure 5B:
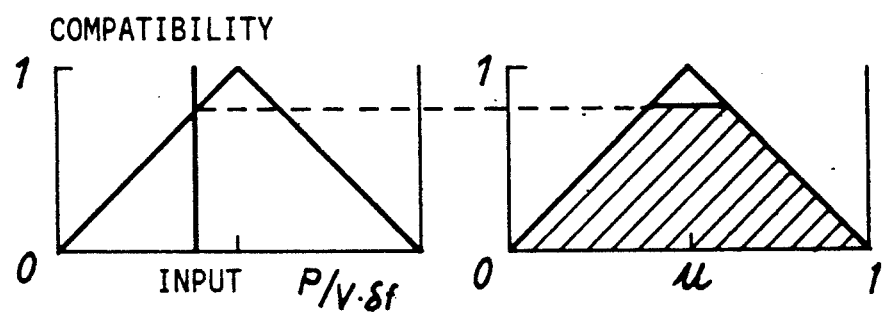
Figure 5C:
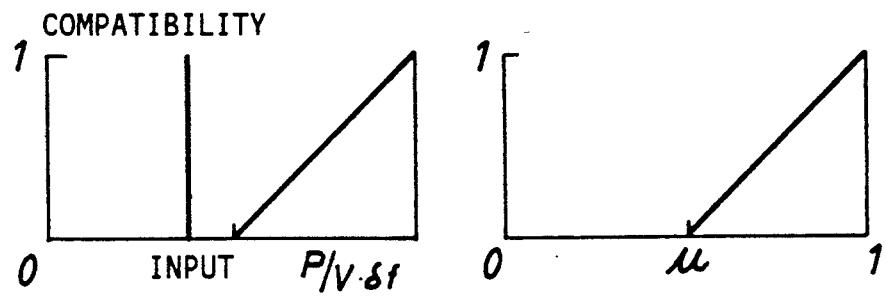

The inference circuit portion 63 is composed of a calculation circuit 63a and inference circuits 63b–63d, the calculation circuit 63a is applied with the electric signals indicative of the hydraulic pressure P, vehicle speed V and steering angle δf to calculate an input hydraulic pressure ratio P/(V* δf) and apply the calculated data to the inference circuits 63b–63d. The inference circuits 63b–63d are designed to provide fuzzy inference data indicative of a compatibility of a road surface frictional coefficient μ related to the input hydraulic pressure ratio P/(V* δf) on a basis of the following fuzzy control rules (7)–(9) such as membership functions shown in FIGS. 5(a)–5(c). In FIGS. 5(a)–5(c), the fuzzy inference data is indicated by a hatched portion.

(7) If the input hydraulic pressure ratio P/(V* δf) is small, the road surface frictional coefficient μ is then defined as a small value.

(8) If the input hydraulic pressure ratio P/V* δf) is medium, the road surface frictional coefficient μ is then defined as a medium value.

(9) If the input hydraulic pressure ratio P/(V* δf) is large, the road surface frictional coefficient μ is then defined as a large value.

Figure 6A:
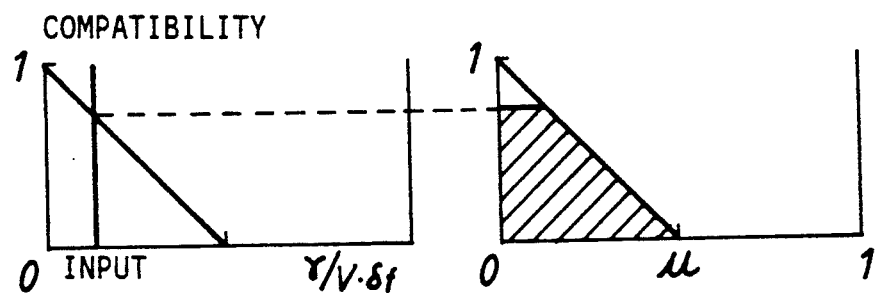
Figure 6B:
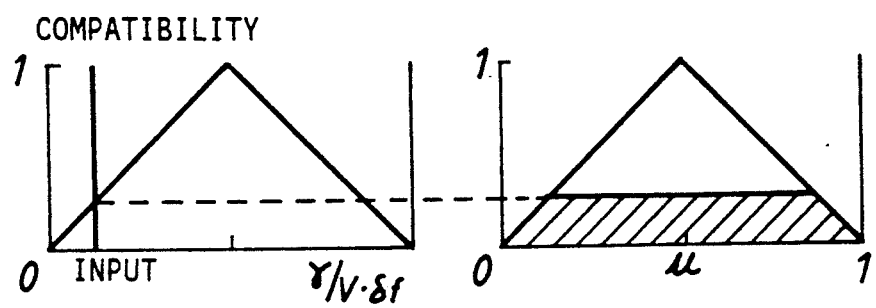
Figure 6C:
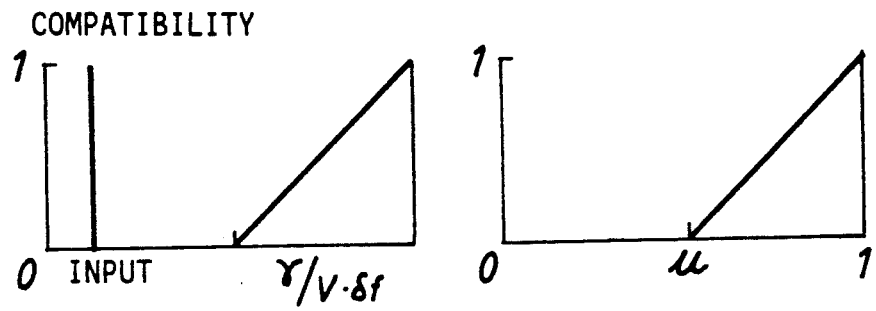

The inference circuit portion 64 is composed of a calculation circuit 64a and inference circuits 64b–64d. The calculation circuit 64a is applied with the electric signal indicative of the yaw-rate γ, vehicle speed V and steering angle δf to calculate an input yaw-rate ratio γ/(V* δf) and apply the calculated data to the inference circuits 64b–64d. The inference circuits 64b–64d are designed to provide fuzzy inference data indicative of a compatibility of a road surface frictional coefficient related to the input yaw-rate ratio γ/(V* δf) on a basis of the following fuzzy control rules (10)–(12) such as membership functions shown in FIGS. 6(a)–6(c). In FIGS. 6(a)–6(c), the fuzzy inference data is indicated by a hatched portion.

(10) If the input yaw-rate ratio γ/(V* δf) is small, the road surface frictional coefficient μ is then defined as a small value.

(11) If the input yaw-rate ratio γ/(V* δf) is medium, the road surface frictional coefficient μ is then defined as a medium value.

(12) If the input yaw-rate ratio γ/(V* δf) is large, the road surface frictional coefficient μ is then defined as a large value.

Figure 7A:
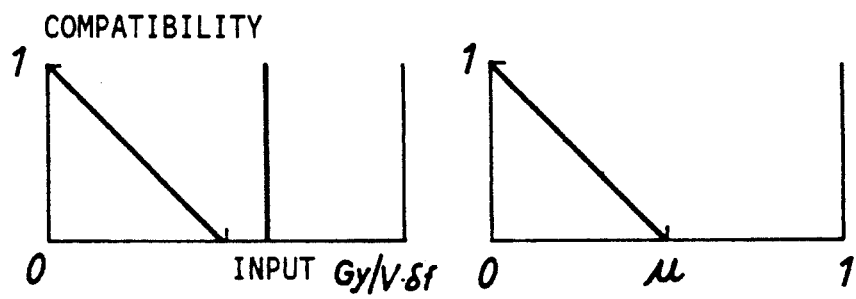
Figure 7B:
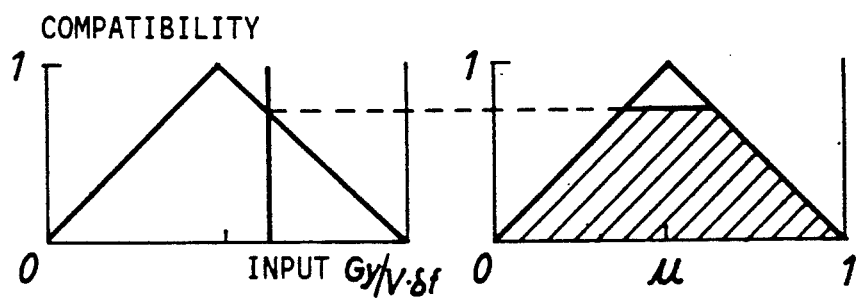
Figure 7C:
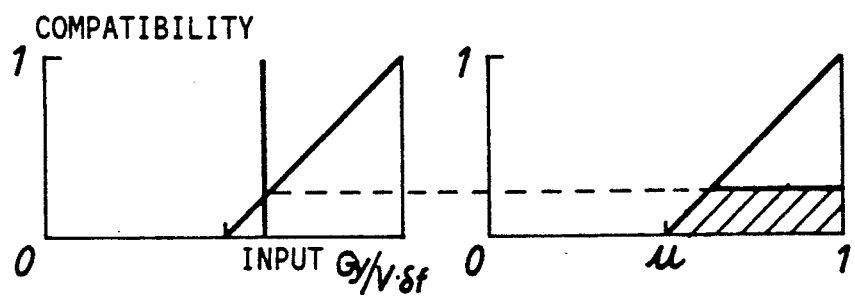

The inference circuit portion 65 is composed of a calculation circuit 65a and inference circuits 65b–65d. The calculation circuit 65a is applied with the electric signals indicative of the lateral acceleration Gy, vehicle speed V and steering angle δf to calculate an input lateral acceleration ratio Gy/(V* δf) and apply the calculated data to the inference circuits 65b–65d. The inference circuits 65b–65d are designed to provide fuzzy inference data indicative of a compatibility of a road surface frictional coefficient μ related to the input lateral acceleration ratio Gy/(V* δf) on a basis of the following fuzzy control rules (13)–(15) such as membership functions shown in FIGS. 7(a)–7(c). In FIGS. 7(a)–7(c), the fuzzy inference data is indicated by a hatched portion.

(13) If the input lateral acceleration ratio Gy/(V* δf) is small, the road surface frictional coefficient μ is then defined as a small value.

(14) If the input lateral acceleration ratio Gy/(V* δf) is medium, the road surface frictional coefficient μ is then defined as a medium value.

(15) If the input lateral acceleration ratio Gy/(V* δf) is large, the road surface frictional coefficient μ is then defined as a large value.

Figure 8A:
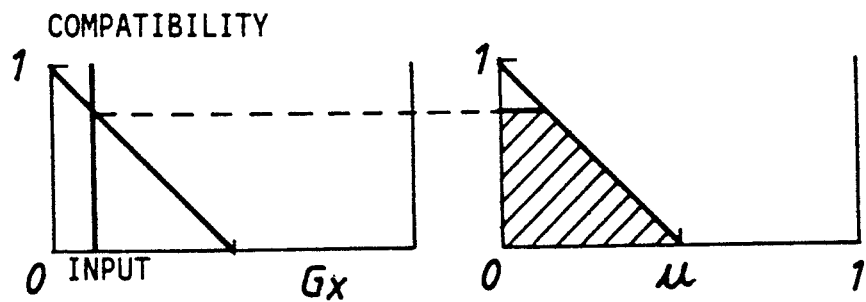
Figure 8B:
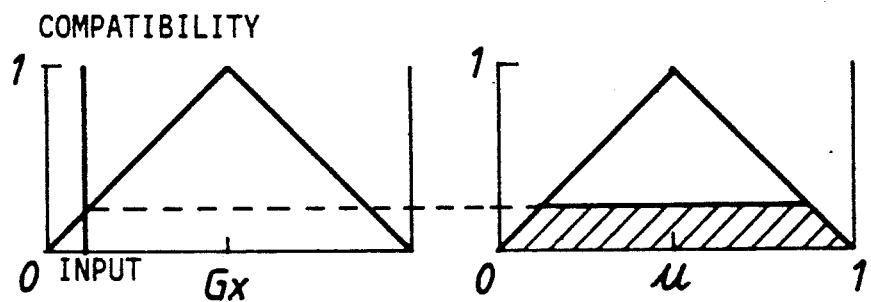
Figure 8C:
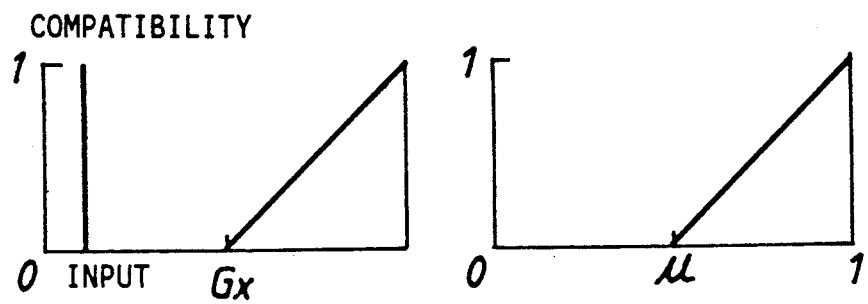

The inference circuit portion 66 is composed of a calculation circuit 66a and inference circuits 66b–66d. The calculation circuit 66a is applied with the electric signals BS, AS indicative of the depressions of the brake and accelerator pedals to produce an output indicative of a logical sum of the electric signal values BS and AS and apply it to the inference circuits 66b–66d. Only when the brake pedal or the acceleration pedal is depressed, the inference circuits 66b–66d are applied with the electric signal indicative of the longitudinal acceleration Gx under control of the output of the calculation circuit 66a to provide fuzzy inference data indicative of a compatibility of a road surface frictional coefficient μ related to the input longitudinal acceleration Gx on a basis of the following fuzzy control rules (16)–(18) such as membership functions shown in FIGS. 8(a)–8(c). In FIGS. 8(a)–8(c), the fuzzy inference data is indicated by a hatched portion.

(16) If the input longitudinal acceleration Gx is small in braking operation or during travel of the vehicle, the road surface frictional coefficient μ is then defined as a small value.

(17) If the input longitudinal acceleration Gx is medium in braking operation or during travel of the vehicle, the road surface frictional coefficient μ is then defined as a medium value.

(18) If the input longitudinal acceleration Gx is large in braking operation or during travel of the vehicle, the road surface frictional coefficient μ is then defined as a large value.

Figure 9A:
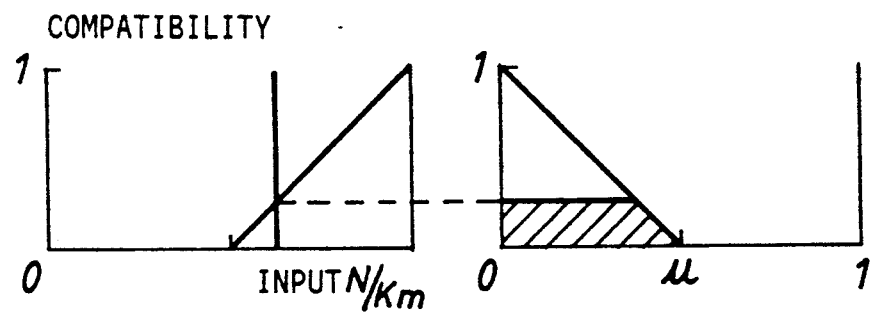
Figure 9B:
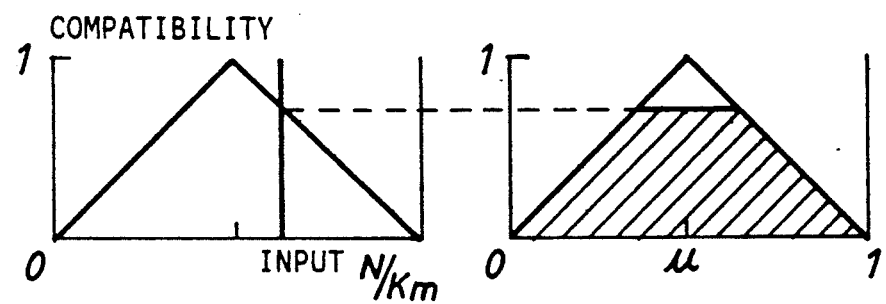
Figure 9C:
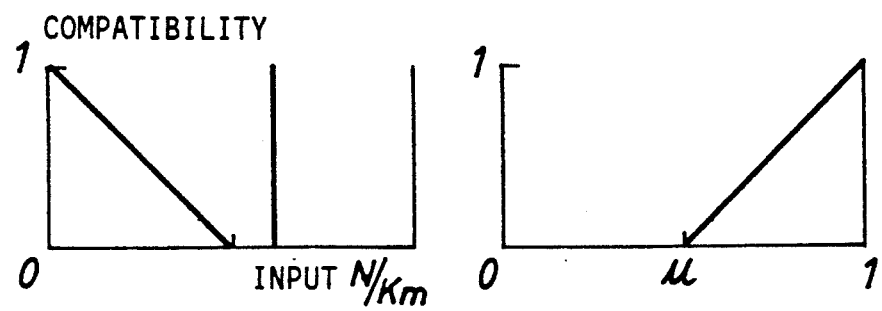

As shown in FIG. 2(b), the inference circuit portion 67 is composed of a calculation circuit 67a and inference circuits 67b–67d. The calculation circuit 67a is applied with the anti-skid control signal ALO and the electric signal indicative of the vehicle speed V to calculate the occurrence number of the anti-skid control signal ALO per a unit travel distance or the frequency of anti-skid operations per a unit travel distance. When applied with the calculated data from the calculation circuit 67a, the inference circuits 67b–67d acts to provide fuzzy inference data indicative of a compatibility of a road surface frictional coefficient $\mu$ related to the frequency N of anti-skid operations on a basis of the following fuzzy control rules (19)–(21) such as membership functions shown in FIGS. 9(a)–9(c). In FIGS. 9(a)–9(c), the fuzzy inference data is indicated by a hatched portion.

(19) If the frequency N of anti-skid operations is high, the road surface frictional coefficient $\mu$ is then defined as a small value.

(20) If the frequency N of anti-skid operations is medium, the road surface frictional coefficient $\mu$ is then defined as a medium value.

(21) If the frequency N of anti-skid operations is low, the road surface frictional coefficient $\mu$ is then defined as a large value.

Figure 10A:
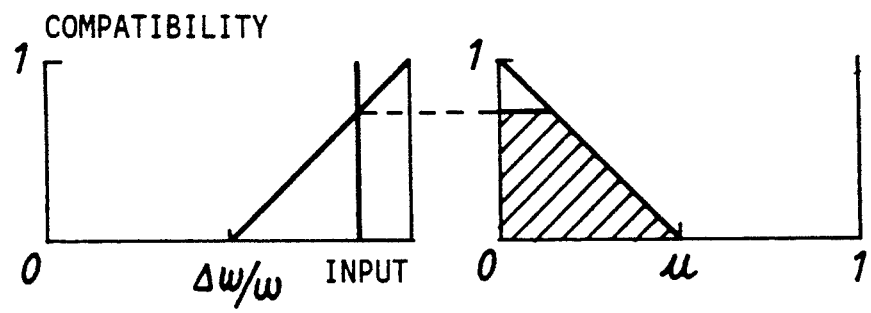
Figure 10B:
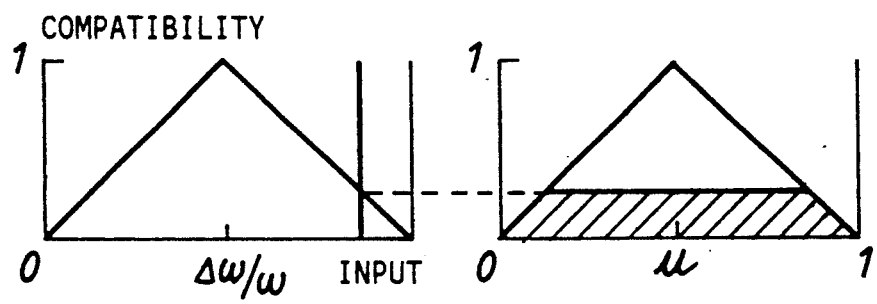
Figure 10C:
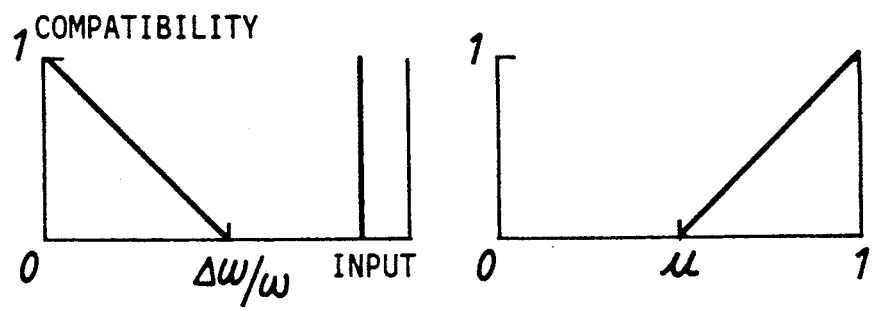

The inference circuit portion 68 is composed of a calculation circuit 68a and inference circuits 68b–68d. The calculation circuit 68a is applied with the electric signals indicative of the difference $\Delta\omega$ in speed between the front and rear road wheels and the average speed $\omega$ of all the road wheels to calculate a difference ratio $\Delta\omega/\omega$ in speed between the front and rear road wheels. Since the automotive vehicle is usually braked at its front or rear side, there will occur a difference in braking force between the front and rear road wheels. As a result, the difference $\Delta\omega$ in speed between the front and rear road wheels is caused by slippage related to a road surface frictional coefficient $\mu$ respectively at the road wheels. When applied with the calculated data from the calculation circuit 68a, the inference circuits 68b–68d acts to provide fuzzy inference data indicative of a compatibility of a road surface frictional coefficient $\mu$ related to the difference ratio $\Delta\omega/\omega$ in speed between the front and rear road wheels on a basis of the following fuzzy control rules (22)–(24) such as membership functions shown in FIGS. 10(a)–10(c). The fuzzy inference data is indicated by a hatched portion in FIGS. 10(a)–10(c).

(22) If the difference ratio $\Delta\omega/\omega$ in speed is large, the road surface frictional coefficient $\mu$ is then defined as a small value.

(23) If the difference ratio $\Delta\omega/\omega$ in speed is medium, the road surface frictional coefficient $\mu$ is then defined as a medium value.

(24) If the difference ratio $\Delta\omega/\omega$ in speed is small, the road surface frictional coefficient $\mu$ is then defined as a large value.

Figure 11A:
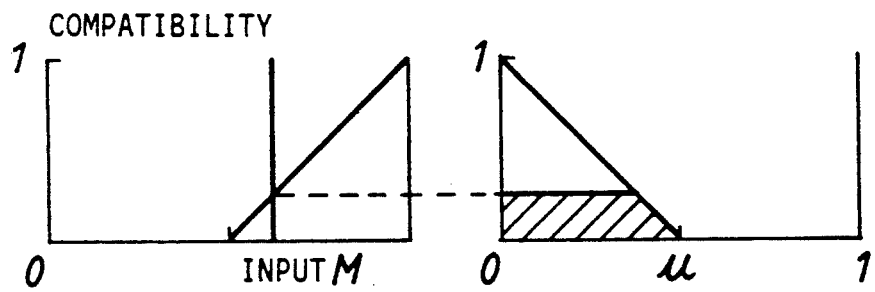
Figure 11B:
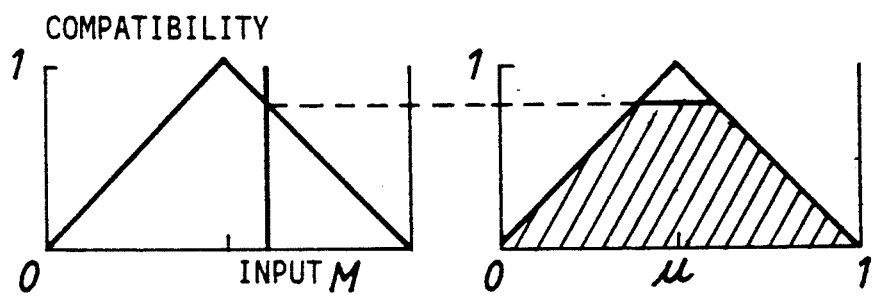
Figure 11C:
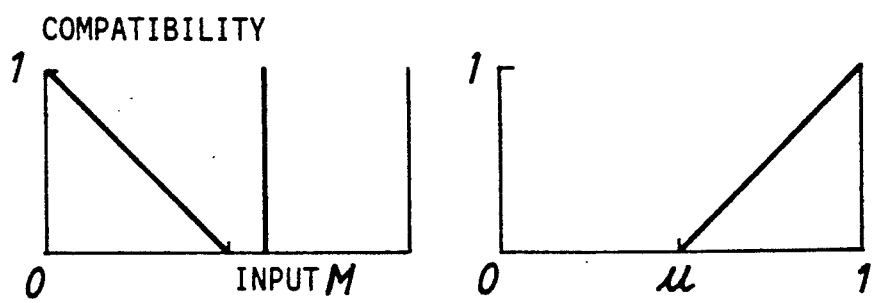

The inference circuit portion 69 is composed of a calculation circuit 69a and inference circuits 69b–69d. The calculation circuit 69a is applied with the electric signal WPO indicative of operation of the wiper to calculate a frequency M of the wiper operation per a unit time and apply the calculated data to the inference circuits 69b–69d. The inference circuits 69b–69d are designed to provide fuzzy inference data indicative of a compatibility of a road surface frictional coefficient $\mu$ related to the frequency M of the wiper operation on a basis of the following fuzzy control rules (25)–(27) such as membership functions shown in FIGS. 11(a)–11(c). The fuzzy inference data is indicated by a hatched portion in FIGS. 11(a)–11(c).

(25) If the frequency M of the wiper operation is high, the road surface frictional coefficient $\mu$ is then defined as a small value.

(26) If the frequency M of the wiper operation is medium, the road surface frictional coefficient $\mu$ is then defined as a medium value.

(27) If the frequency M of the wiper operation is low, the road surface frictional coefficient $\mu$ is then defined as a large value.

Figure 12A:
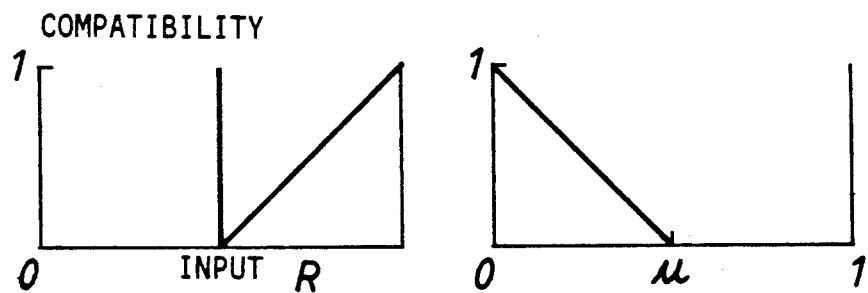
Figure 12B:
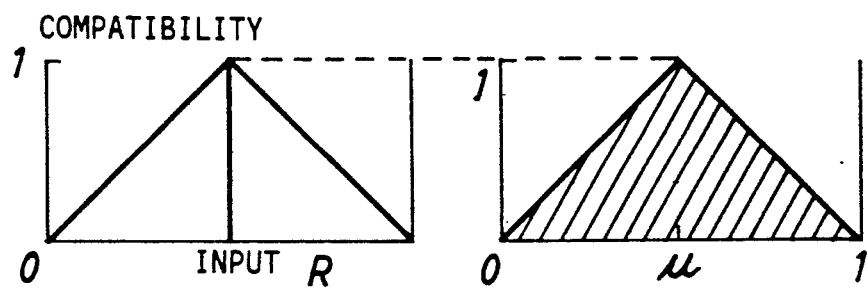
Figure 12C:
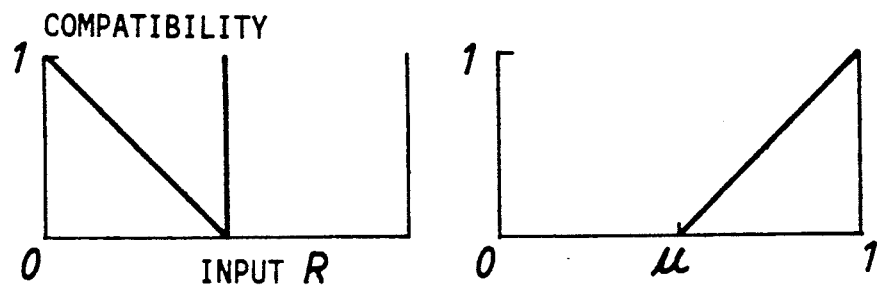

The inference circuit portion 70 is composed of inference circuits 70a–70c which are applied with the electric signal indicative of the humidity R to provide fuzzy inference data indicative of a compatibility of a road surface frictional coefficient $\mu$ related to the humidity R on a basis of the following fuzzy control rules (28)–(30) such as membership functions shown in FIGS. 12(a)–12(c). The fuzzy inference data is indicated by a hatched portion in FIGS. 12(a)–12(c).

(28) If the humidity R is high, the road surface frictional coefficient $\mu$ is then defined as a small value.

(29) If the humidity R is medium, the road surface frictional coefficient $\mu$ is then defined as a medium value.

(30) If the humidity R is low, the road surface frictional coefficient $\mu$ is then defined as a large value.

Figure 13A:
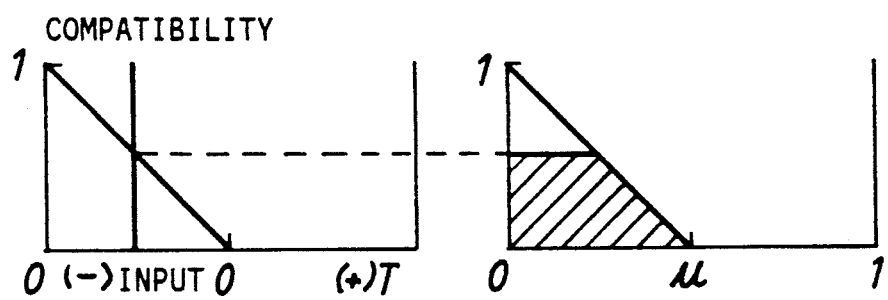
Figure 13B:
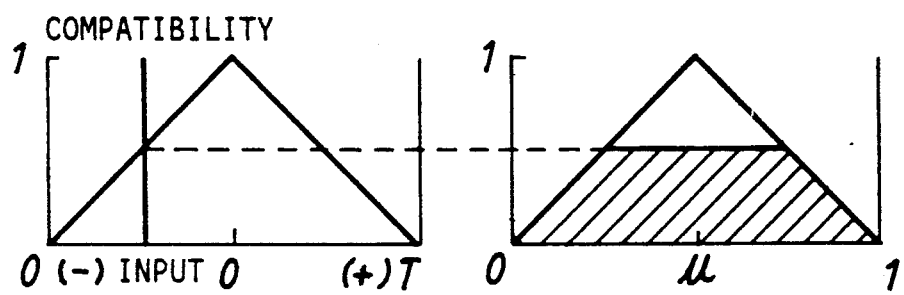
Figure 13C:
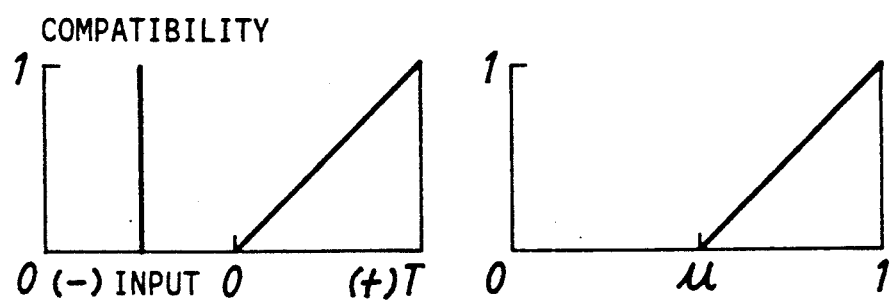

The inference circuit portion 71 is composed of inference circuits 71a–71c which are applied with the electric signal indicative of the outside air temperature T to provide fuzzy inference data indicative of a compatibility of a road surface frictional coefficient $\mu$ related to the outside air temperature T on a basis of the following fuzzy control rules (31)–(33) such as membership functions shown in FIGS. 13(a)–13(c). The fuzzy inference data is indicated by a hatched portion in FIGS. 13(a)–13(c).

(31) If the outside air temperature T is lower than 0 centigrade, the road surface frictional coefficient $\mu$ is then defined as a small value.

(32) If the outside air temperature T is approximately 0 centigrade, the road surface frictional coefficient $\mu$ is then defined as a medium value.

(33) If the outside air temperature T is higher than 0 centigrade, the road surface frictional coefficient $\mu$ is then defined as a large value.

Figure 14:
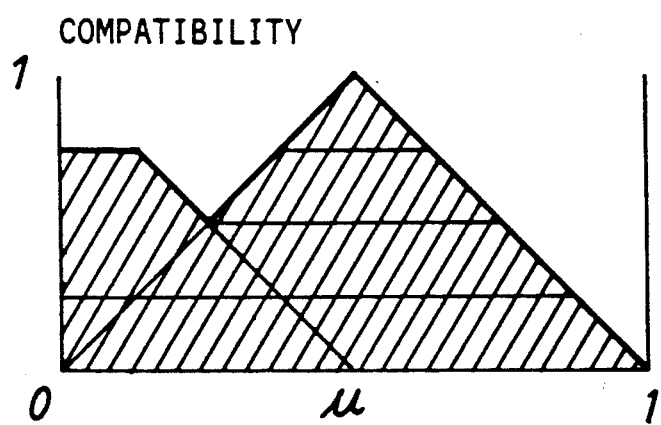
FIG. 14 is a graph showing a synthesized condition of fuzzy inference data.

As is understood from the above description, the fuzzy control rules (1)–(15) are related to a condition at respective portions of the vehicle in turning operation, the fuzzy control rules (16)–(24) are related to a condition at respective portions of the vehicle in braking operation, and the fuzzy control rules (25)–(33) are related to various weather conditions during travel of the vehicle. The fuzzy control rules have been confirmed by theoretical consideration, past experience and experiments. The fuzzy inference data provided at the inference circuit portions 61–71 are applied to an OR circuit 72 which is associated with a definite value calculation circuit 73 to calculate a definite value of road surface frictional coefficient based on a center of gravity method as described below. The OR circuit 72 sequentially synthesizes a logical sum of the fuzzy inference data to finally provide a definite data indicative of a logical sum of the hatched portions shown in FIGS. 3(a)–13(c). The definite data is provided as shown by a figure in FIG. 14. The definite value calculation circuit 73 calculates a road surface frictional coefficient $\mu$ corresponding with a center position of gravity in the figure of FIG. 14. Thus, the calculated road surface frictional coefficient $\mu$ is applied to the anti-skid control circuit 11, suspension control circuit 16, steering control circuit 25 and rear-wheel steering control circuit 35 to be utilized as one of their control factors.

Assuming that the vehicle is travelling, the travel speed V, steering angle δf, torque Tm, axial force F, hydraulic pressure P, yaw-rate γ, lateral acceleration Gy, longitudinal acceleration Gx, wiper operation, humidity R, outside temperature T and depression of the brake pedal or the accelerator pedal are detected by sensors 22, 23, 42-48, 51, 52, 14a-14d, and a difference Δω in speed between the front and rear road wheels and an average speed ω of all the road wheels are calculated by the rotation number calculation circuit 55. Thus, the road surface fridctional coefficient detection apparatus 60 is applied with electric signals indicative of the detected values V, δf, Tm, F, P, γ, Gy, Gx, R, T, Δω, ω and is applied with electric signals WPO, BS, AS respectively indicative of the wiper operation and depression of the brake pedal or accelerator pedal. The detection apparatus 60 is further applied with an electric anti-skid control signal ALO from the anti-skid control circuit 11. In the detection apparatus 60, the inference circuit portions 61-71 responds to the applied signals to provide fuzzy inference data respectively based on the fuzzy control rules (1)-(33). When applied with the fuzzy inference data, the OR circuit 72 cooperates with the definite value calculation circuit 73 to calculate a definite value of road surface frictional coefficient based on the fuzzy control data by the center of gravity method.

In this embodiment, the definite value of road surface frictional coefficient μ is inferred on a basis of the fuzzy control rules (1)-(15) related to the detected values V, δf, Tm, F, P, γ, Gy representing a condition at respective portions of the vehicle in turning operation, the fuzzy control rules (16)-(24) related to the detected values Gx, Δω, ω, ALO, BS, AS representing a condition at respective portions of the vehicle in braking operation and the fuzzy control rules (25)-(33) related to the detected values R, T, WPO representing various weather conditions during travel of the vehicle. Accordingly, the definite value of road surface frictional coefficient μ can be properly calculated on a basis of the fuzzy inference data. The definite value of road surface frictional coefficient is applied to the anti-skid control circuit 11, suspension control circuit 16, power steering control circuit 25 and rear-wheel steering control circuit 35 for such additional control as described below.

The anti-skid control circuit 11 responds to the definite value of road surface frictional coefficient applied thereto from the detection apparatus 60 to control the hydraulic brake pressure control apparatus 12 in such a manner that the hydraulic pressure applied to the wheel brake cylinders is gradually increased in braking operation when the definite value of road surface frictional coefficient μ is small and that the supply speed of hydraulic fluid under pressure to the wheel brake cylinders is increased in accordance with an increase of the definite value of road surface frictional coefficient μ. Under such control of the brake pressure control apparatus 12, skidding of the road wheels in braking operation can be avoided in a more reliable manner to shorten the stopping distance of the vehicle. The suspension control circuit 16 responds to the definite value of road surface frictional coefficient applied thereto from the detection apparatus 60 to control the suspension pressure control apparatus 17 in such a manner that an estimated turning radius of the vehicle is increased in accordance with a decrease of the definite value of road surface frictional coefficient μ. Under such control of the suspension pressure control apparatus 17, a reverse roll of the vehicle in turning can be avoided in a more reliable manner.

The power steering control circuit 25 responds to the definite value of road surface frictional coefficient applied thereto from the detection apparatus 60 to increase the reaction force acting on the steering shaft 31 in accordance with a decrease of the definite value of road surface frictional coefficient μ and to decrease the reaction force in accordance with an increase of the definite value of road surface frictional coefficient μ. Under such control of the power steering control circuit 25, an excessive steerage of the vehicle can be avoided during travel on roads of low frictional coefficient. The rear-wheel steering control circuit 35 responds to the definite value of road surface frictional coefficient applied thereto from the detection apparatus 60 to control the rear power cylinder 36 in such a manner that the steering angle of the rear road wheels 13c, 13d is slightly varied in the same direction as the front road wheels when the definite value of road surface frictional coefficient μ is small and that the variation amount of the steering angle of the rear road wheels is increased in the same direction in accordance with a decrease of the definite value of road surface frictional coefficient μ. Under such control of the rear-wheel steering control circuit 35, the stability of the vehicle during travel on roads of low frictional coefficient can be enhanced.

Although in the above embodiment the center of gravity method has been adapted to calculate a definite value of road surface frictional coefficient at the definite value calculation circuit 73, and area method or a load average method may be adapted to calculate the definite value of road surface frictional coefficient based on the respective fuzzy inference data. In such a case, the respective road surface frictional coefficients corresponding with each center of gravity in figures represented by the respective fuzzy inference data are weighted with each area of the figures, and a total sum of the weighted frictional coefficients is calculated. Thereafter, the total sum of the weighted frictional coefficients is divided by a total sum of road surface frictional coefficients corresponding with each center of gravity in the figures. Although in the above embodiment thirth three fuzzy control rules have been adapted to calculate a definite value of road surface frictional coefficient μ, some of the control rules may be omitted taking into consideration with a calculation speed, a circuit scale or the like.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A detection apparatus for detecting a frictional coefficient of a road surface on which an automotive vehicle travels, comprising:

detecting means for detecting conditional parameters, the conditional parameters being at least a hydraulic pressure applied to a power cylinder of a power assisted steering apparatus of the vehicle and a lateral acceleration acting on the vehicle;

fuzzy inference means for performing a fuzzy inference on the detected conditional parameters to determine a compatibility value corresponding to each detected conditional parameter, each compatibility value relating to a road surface frictional coefficient;

generating means for generating said road surface frictional coefficient based on the compatibility values.

2. The detection apparatus of claim 1, wherein the generating means includes means for logically summing the compatibility values and means for determining the road surface frictional coefficient based on the logical sum.

3. The detection apparatus of claim 1, wherein the detecting means includes means for detecting longitudinal acceleration of the vehicle as one of said conditional parameters.

4. The detection apparatus of claim 1, wherein the detecting means includes means for detecting torque acting on a steering shaft of the vehicle as one of said conditional parameters and means for detecting an axial force acting on a lateral bar in operative connection with a set of wheels of the vehicle as another one of said conditional parameters.

5. The detection apparatus of claim 4, wherein the detecting means includes ratio means for determining a ratio of the detected torque to a centrifugal force acting on the vehicle as one of said conditional parameters.

6. The detection apparatus of claim 5, wherein the detecting means includes means for detecting a traveling speed of the vehicle; and the ratio means includes calculating means for calculating the centrifugal force based on said traveling speed of the vehicle and a steering angle of the steering shaft.

7. The detection apparatus of claim 3, wherein the detecting means includes means for detecting a yaw rate of the vehicle as one of said conditional parameters.

8. The detecting apparatus of claim 7, wherein the detecting means includes means for detecting front and rear wheel speeds of the vehicle; and means for determining a difference between the detected front and rear wheels speeds as one of said conditional parameters.

9. The detection apparatus of claim 3, wherein the detecting means includes means for detecting front and rear wheel speeds of the vehicle; and means for determining a difference between the detected front and rear wheels speeds as one of said conditional parameters.

10. The detecting apparatus of claim 9, wherein the detecting means includes means for determining a frequency of operation of an anti-skid control system of the vehicle as one of said conditional parameters.

11. The detecting means of claim 10, wherein the detecting means includes means for detecting a frequency of operation of a wiper of the vehicle, means for detecting humidity, and means for detecting ambient temperature as said conditional parameters.

* * * * *